United States Patent
Virtuoso et al.

(10) Patent No.: US 10,944,814 B1
(45) Date of Patent: Mar. 9, 2021

(54) INDEPENDENT RESOURCE SCHEDULING FOR DISTRIBUTED DATA PROCESSING PROGRAMS

(71) Applicant: Amazon Technologies, Inc., Seattle, WA (US)

(72) Inventors: Anthony Virtuoso, Hawthorne, NJ (US); Turkay Mert Hocanin, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 15/831,023

(22) Filed: Dec. 4, 2017

(51) Int. Cl.
| | |
|---|---|
| *G06F 15/16* | (2006.01) |
| *H04L 29/08* | (2006.01) |
| *H04L 12/927* | (2013.01) |
| *H04L 29/06* | (2006.01) |
| *G06F 16/903* | (2019.01) |

(52) U.S. Cl.
CPC ........ *H04L 67/1014* (2013.01); *H04L 47/803* (2013.01); *H04L 67/34* (2013.01); *G06F 16/903* (2019.01); *H04L 67/42* (2013.01)

(58) Field of Classification Search
CPC ... H04L 67/1014; H04L 47/803; H04L 67/34; H04L 67/42; H04L 67/10; G06F 16/903; G06F 9/5005; G06F 9/5072; G06F 9/5027; G06F 9/5066; G06F 2209/5011
USPC ............... 709/201, 203, 208, 223, 224, 226; 718/104
See application file for complete search history.

(56) References Cited

U.S. PATENT DOCUMENTS

| | | | |
|---|---|---|---|
| 7,398,525 B2 | 7/2008 | Leymann et al. | |
| 7,984,043 B1* | 7/2011 | Waas | G06F 16/8358 707/718 |
| 8,402,469 B2 | 3/2013 | Bose et al. | |
| 2005/0192937 A1 | 9/2005 | Barsness et al. | |
| 2008/0313380 A1* | 12/2008 | Brown | G06F 9/30094 710/311 |
| 2009/0254916 A1* | 10/2009 | Bose | G06F 16/2455 718/104 |
| 2010/0275212 A1* | 10/2010 | Saha | G06F 9/5027 718/104 |
| 2011/0083136 A1* | 4/2011 | Shinozaki | G06F 9/5044 718/107 |
| 2014/0325070 A1* | 10/2014 | Philip | H04L 47/70 709/226 |
| 2016/0378560 A1* | 12/2016 | Lu | G06F 9/5066 718/104 |
| 2017/0185452 A1* | 6/2017 | Cao | G06F 9/5066 |
| 2018/0181439 A1* | 6/2018 | Jackson | G06F 9/5016 |

(Continued)

*Primary Examiner* — Johnny B Aguiar
(74) *Attorney, Agent, or Firm* — Robert C. Kowert; Kowert, Hood, Munyon, Rankin & Goetzel, P.C.

(57) ABSTRACT

Independent scheduling of resources may be performed for distributed data processing programs. When a request is received that causes the performance of a distributed data processing program, a plan to perform the distributed data processing program may be generated. Different resources may be obtained to perform different portions of the distributed data processing program according to different portions of the generated plan. A result of the request may be provided to a user. In some embodiments, resources obtained for different portions of the distributed data processing program may be returned for use by other programs.

20 Claims, 14 Drawing Sheets

(56) References Cited

U.S. PATENT DOCUMENTS

| | | | |
|---|---|---|---|
| 2018/0300176 A1* | 10/2018 | Chen ..................... | G06F 9/5072 |
| 2019/0146847 A1* | 5/2019 | Gibson ................ | G06F 9/5011 |
| | | | 718/104 |
| 2019/0163842 A1* | 5/2019 | Pal ....................... | G06F 16/904 |

* cited by examiner

INDEPENDENT RESOURCE SCHEDULING FOR DISTRIBUTED DATA PROCESSING PROGRAMS

BACKGROUND

Computing systems for processing of large sets of data can be extremely difficult to implement and maintain. In many scenarios, for example, it is necessary to first create and configure the infrastructure (e.g. server computers, storage devices, networking devices, etc.) to be used for the data processing operations. It might then be necessary to perform extract, transform, and load ("ETL") operations to obtain data from a source system and place the data in data storage. It can also be complex and time consuming to install, configure, and maintain the application that performs the data processing operations.

Distributed data processing programs can be utilized in some scenarios to process large data sets in a performant manner. For instance, a computing cluster can have many nodes that each execute a distributed query framework for performing distributed querying of a large data set. Such distributed data processing programs, however, can be difficult to implement, configure, and maintain. Moreover, incorrect configuration and/or use of distributed data processing programs such as these can result in the non-optimal utilization of processor, storage, network and, potentially, other types of computing resources.

Figure 1:
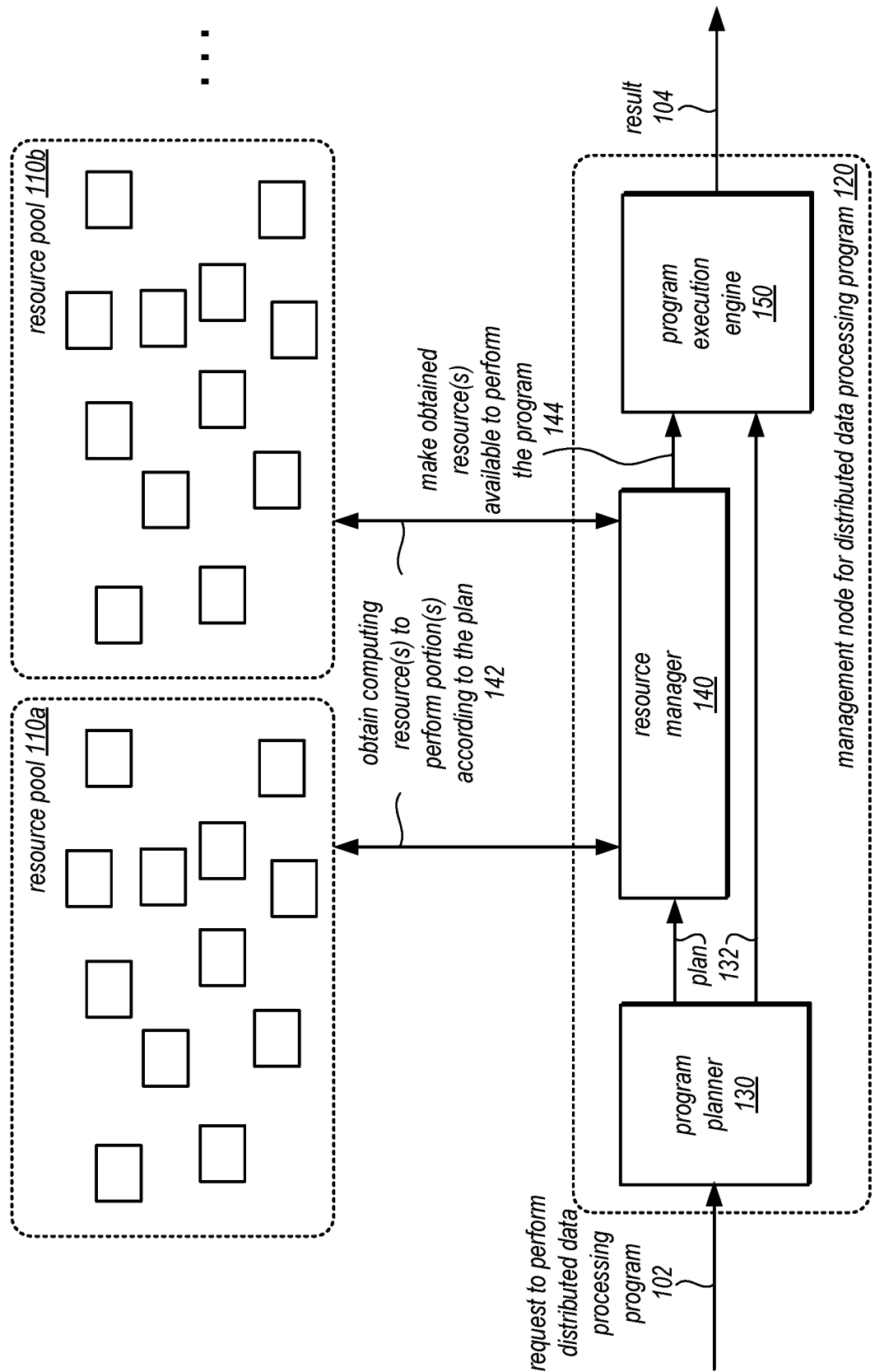
FIG. 1 is a logical block diagram illustrating independent resource scheduling for distributed data processing programs, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of independent resource scheduling for distributed data processing programs are described herein. Distributed data processing programs are implemented to perform a variety of tasks or operations to generate, create, evaluate, transform, move, remove, combine, reformat, or otherwise interact with data, often stored in distributed fashion, in some embodiments. Because distributed applications may utilize multiple resources to perform the tasks or operations, distributed data processing programs can operate on large amounts of data with faster performance, in some embodiments. Large numbers of computing resources, such as various servers, nodes, hosts, or other hardware and/or software resources may be allocated to distributed data processing programs in order to complete the tasks or operations, in some embodiments.

A manager, coordinator, leader, master, or other computing resource for directing execution of a distributed data processing program may plan and/or instruct other computing resources that perform work as part of the distributed data processing program, in some embodiments. In order to utilize the computing resources to perform the work, the management resource may independently obtain assignments or allocations of computing resources to perform the work (e.g., as a series of staged groups of resources, dynamically obtained or just-in-time resources, and so on), instead of relying upon a global resource manager that dictates how resources may be shared amongst competing programs or a statically defined group of resources allocated to the distributed data processing program, in some embodiments. In this way, capacity planning and other resource management concerns for attempting to optimally size groups of resources for performing distributed data processing may be reduced or eliminated. Moreover, different portions of the work performed by the distributed data processing program can obtain different computing resources for the different portions, which may optimally use different combinations or types of computing resources to perform work for that portion of the distributed data processing program, in some embodiments. In this way, work for the distributed data processing application may avoid the use of static resource assignments to a particular cluster of computing resources, for instance. Instead, the number and/or type of computing resources may grow or shrink according to the requirements of the portion (and availability of computing resources) in some embodiments.

FIG. 1 is a logical block diagram illustrating independent resource scheduling for distributed data processing programs, according to some embodiments. Pool(s) of computing resources, such as pools 110a and 110b, may include various different kinds of computing resources to perform work as part of a distributed data processing program. For example, computing resources may be individual servers, nodes, processors (or processor cores), or other hardware resources that may be allocated in part (e.g., a single processor core) or in whole to perform work for a distributed data processing program. In some embodiments, as discussed below with regard to FIGS. 2 and 3, the computing resources may be virtualized resources (e.g., virtual machines or operating system virtualization). In at least some embodiments, the computing resources may be preloaded or configured to perform work for different types of distributed data processing applications. For example, computing resources may be preconfigured to perform as executors in distributed processing program utilizing Apache Spark and/or as worker nodes to perform the work of Presto. In this way, setup time for performing distributed data processing programs can be significantly reduced, in some embodiments. Computing resources of pool(s) 110 of computing resources may be dedicated to performing work for a single type of distributed data processing program or platform, or may be preconfigured to perform work for multiple different types of data processing platforms, in some embodiments. Please note that the pools of distributed data processing programs given above are examples. Various other distributed data processing platforms, applications or other programs may utilize resources from pool(s) of computing resources 110.

Management node 120 for a distributed data processing program may be launched or initiated in response to and/or receive a request 102 to perform a distributed data processing program, in some embodiments. A request 102 may be received as the result of an event or other trigger condition that automatically generates a request to start performance or execution of a distributed data processing program, in some embodiments. For instance, time-based events (e.g., according to scheduled intervals, times, or other measures of time) may trigger the generation of a request to cause performance of a distributed data processing program. In some embodiments, requests 102 may be manually generated or received via graphical or other user interface (e.g., a command line interface) to which a user has provided input to cause performance of the distributed data processing program. The request may be received via a programmatic interface, in some embodiments, such as an API call that requests performance of an identified application, such as a request to perform a query at a managed query service as discussed below with regard to FIGS. 2-6 or other service, such as request to perform a job at a map reduce service or other distributed data processing service, as discussed below with regard to FIG. 2.

Management node 120 may implement program planner 130 to determine a plan 132 for performing the distributed data processing program, in some embodiments. For example, the code, script, instructions, or other information (which may be identified or invoked by the request 102) may be used to generate an execution directed acyclical graph (DAG) of operations or tasks to perform, in some embodiments. A query plan, for instance, in response to perform a distributed query may be generated as a tree or other from DAG, in some embodiments.

Management node 120 may implement a resource manager 140 to perform independent resource management specific to the distribute data processing program being performed by management node 120. Resource manager 140 may be a library, agent, or other component which may be invoked by program planner 130, program execution engine 150, or other component of management node 120 to obtain computing resource(s) 142 to perform portion(s) of the distributed data processing program according to the plan. For example, different groups, stages, or other associated tasks or operations (e.g., one or multiple nodes or portions of the DAG) may be performed by groups of resources that are independently obtained to perform the corresponding work. Resource manager 140 may include various interfaces to access resource pools 110 to obtain resources for different portions. In some embodiments, resource manager 140 can identify or determine the resources and/or sources for resources, according to the techniques discussed below with regard to FIG. 10. Resource manager 140 may make the obtained resources available 144 to the distributed data processing program in order to perform the corresponding portions of the plan. Program execution engine 150, for example, may be implemented as part of management node 120 to direct the obtained resources to perform the various operations or tasks in the portion of the plan 132 for which the resources were obtained. Some resources may participate in some or all of the various portions of the plan for a distributed data processing program, while other resources may be utilized in a single portion of the plan.

A result 104 of the request to perform the distributed data processing program may be provided, in some embodiments, by management node 120. The result may be, for instance, desired data (e.g., a query result), error response, acknowledgment of completion, or other indication related to the performance of the distributed data processing program. The result may be provided to a user that may be associated with a client computing device or other application that submitted the request to perform the distributed data processing program or other another device or system registered or otherwise identified for receiving the result, in some embodiments.

Please note that the previous description of independent resource scheduling for distributed data processing programs is a logical illustration and thus is not to be construed as limiting as to the implementation of resource pools, resources, a management node, program planner, resource manager, and/or program execution engine.

This specification begins with a general description of a provider network that implements a managed query service (or other services) that manages the execution of requests to perform distributed data processing by allowing management resources launched to perform a distributed data processing program to independently schedule resources to perform the distributed data processing program. Then various examples of the managed query service (along with other services that may be utilized or implemented) including different components/modules, or arrangements of components/module that may be employed as part of implementing the services are discussed. A number of different methods and techniques to implement independent resource scheduling for distributed data processing programs are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
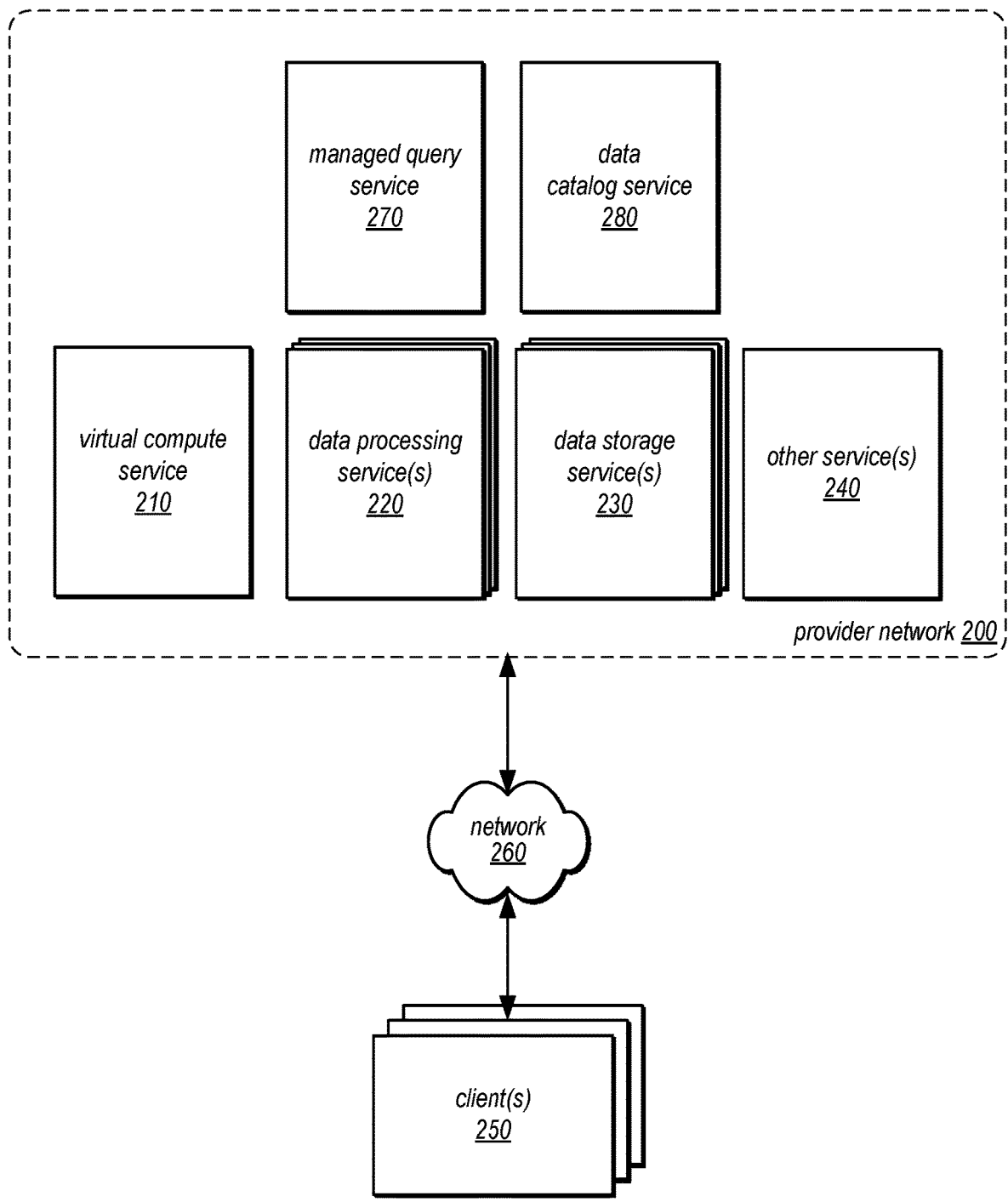
FIG. 2 is a logical block diagram illustrating a provider network offering a managed query service that implements independent resource scheduling for performing distributed query processing, according to some embodiments.

FIG. 2 is a logical block diagram illustrating a provider network offering a managed query service that implements independent resource scheduling for performing distributed query processing, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., FIGS. 12, 13 and computing system 2000 described below with regard to FIG. 14), needed to implement and distribute the infrastructure and storage services offered by the provider network 200. In some embodiments, provider network 200 may implement various computing resources or services, such as a virtual compute service 210, data processing service(s) 220, (e.g., relational or non-relational (NoSQL) database query engines, map reduce processing, micro-batch processing, stream or data flow processing, and/or other large scale data processing techniques), data storage service(s) 230, (e.g., an object storage service, block-based storage service, or data storage service that may store different types of data for centralized access) other services 240 (any other type of network based services (which may include various other types of storage, processing, analysis, communication, event handling, visualization, and security services not illustrated), managed query service 270, and data catalog service 280.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 202 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. Different configurations of compute instances, as discussed below with regard to FIG. 3, may be implemented as computing assigned to perform different portions of distributed data processing programs, such as queries routed to select resources by managed query service 270 or other distribute data processing programs discussed below with regard to FIG. 9.

In some embodiments, virtual compute service 210 may implement operating system virtualization or containers as a service. Containers may allow users to run applications on a managed cluster of virtual compute instances, in some embodiments. Containers hosted by virtual compute service 210 may perform and manage installation, operation, and scaling of user identified containers (e.g., as a cluster) on behalf a user, in some embodiments. API calls may obtain, configure, launch and stop container-enabled applications, query the state of containers (or a group of containers, such as a cluster), and access features for managing containers (e.g., security features, network or traffic routing, storage, and authorization or other access management features), in some embodiments.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that provisions processing nodes that implement map reduce functionality over data stored in one of data storage services 240. Techniques similar to those discussed below with regard to managed query service may be implemented for the map reduce or other distributed data processing service. For example, requests to perform map reduce jobs, tasks, or other operations may cause the performance of a distributed application, launch a management node that may obtain resources to perform different portions of the job according to a plan to perform the job, in some embodiments.

Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 220 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230. For example, a data set stored in a non-relational format may be identified along with a container or group in an object-based data store that stores the data set along with other data objects on behalf of a same customer or client of provider network 200. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources configured to process queries with respect to the data, as discussed below with regard to FIGS. 3-6.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-8, may manage the execution of queries on behalf of clients so that clients may perform queries over data stored in one or multiple locations (e.g., in different data storage services, such as an object store and a database service) without configuring the resources to execute the queries, in various embodiments.

Generally speaking, clients 250 may encompass any type of client configurable to submit network-based requests to provider network 200 via network 260, including requests for storage services (e.g., a request to create, read, write, obtain, or modify data in data storage service(s) 230, etc.) or managed query service 270 (e.g., a request to query data in a data set stored in data storage service(s) 230). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document-based or message-based, network-based services architecture, or other network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., access requests directed to data in data storage service(s) 230, operations, tasks, or jobs, being performed as part of data processing service(s) 220, requests to cause performance of a distributed data processing program, such as requests to managed query service 270, or to interact with data catalog service 280) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
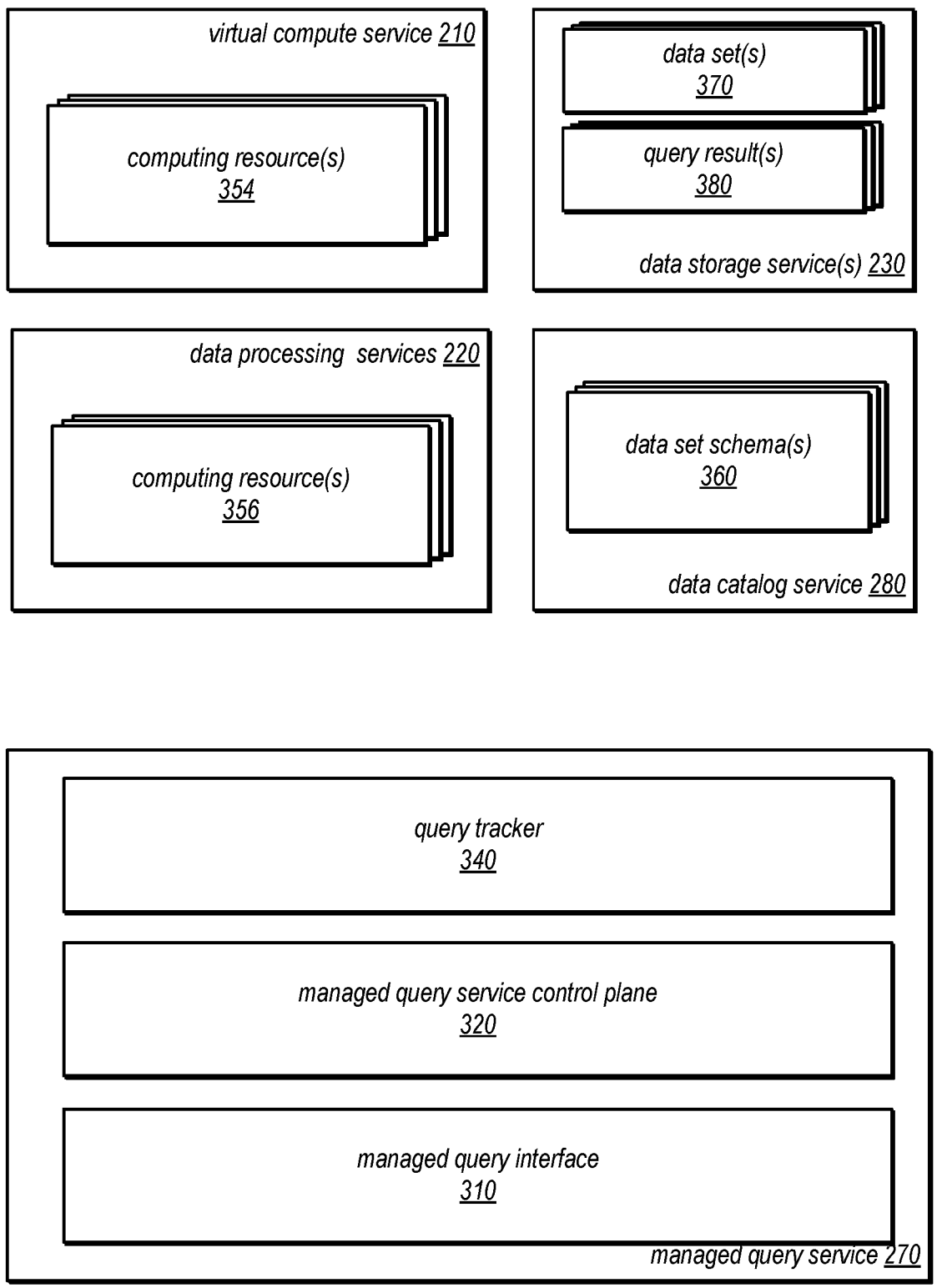
FIG. 3 is a logical block diagram illustrating a managed query service, according to some embodiments.

FIG. 3 is a logical block diagram illustrating a managed query service, according to some embodiments. As discussed below with regard to FIGS. 4-8, managed query service 270 may leverage the capabilities of various other services in provider network 200. For example, managed query service 270 may utilize preconfigured resources from other provider network services to execute queries. For example, different network-based services may be a source to implement or obtain computing resources individually or as part of resource pool(s), such as computing resource(s) 354 in virtual compute service 210 and computing resource(s) 356 in data processing service(s) 220.

Once a resource from a pool or service is obtained (e.g., according to the independent resource scheduling techniques discussed below), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 352, as discussed below with regard to FIG. 4, for subsequent use when processing queries, as discussed below with regard to FIGS. 5-6, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, resource planner workers for resource planner 330, or query tracker monitors for query tracker 340). Managed query service control plane 320 may direct requests to appropriate components as discussed below with regard to FIG. 5. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s) 230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

In various embodiments, managed query service 270 may implement query tracker 340 in order to manage the execution of queries at compute clusters, track the status of queries and the resources obtained for the execution of queries by management nodes directing the performance of the query. For example, query tracker 340 may maintain a database or other set of tracking information based on updates received from different managed query service agents implemented on provisioned computing resources, as discussed below with regard to FIGS. 5 and 6.

Figure 4:
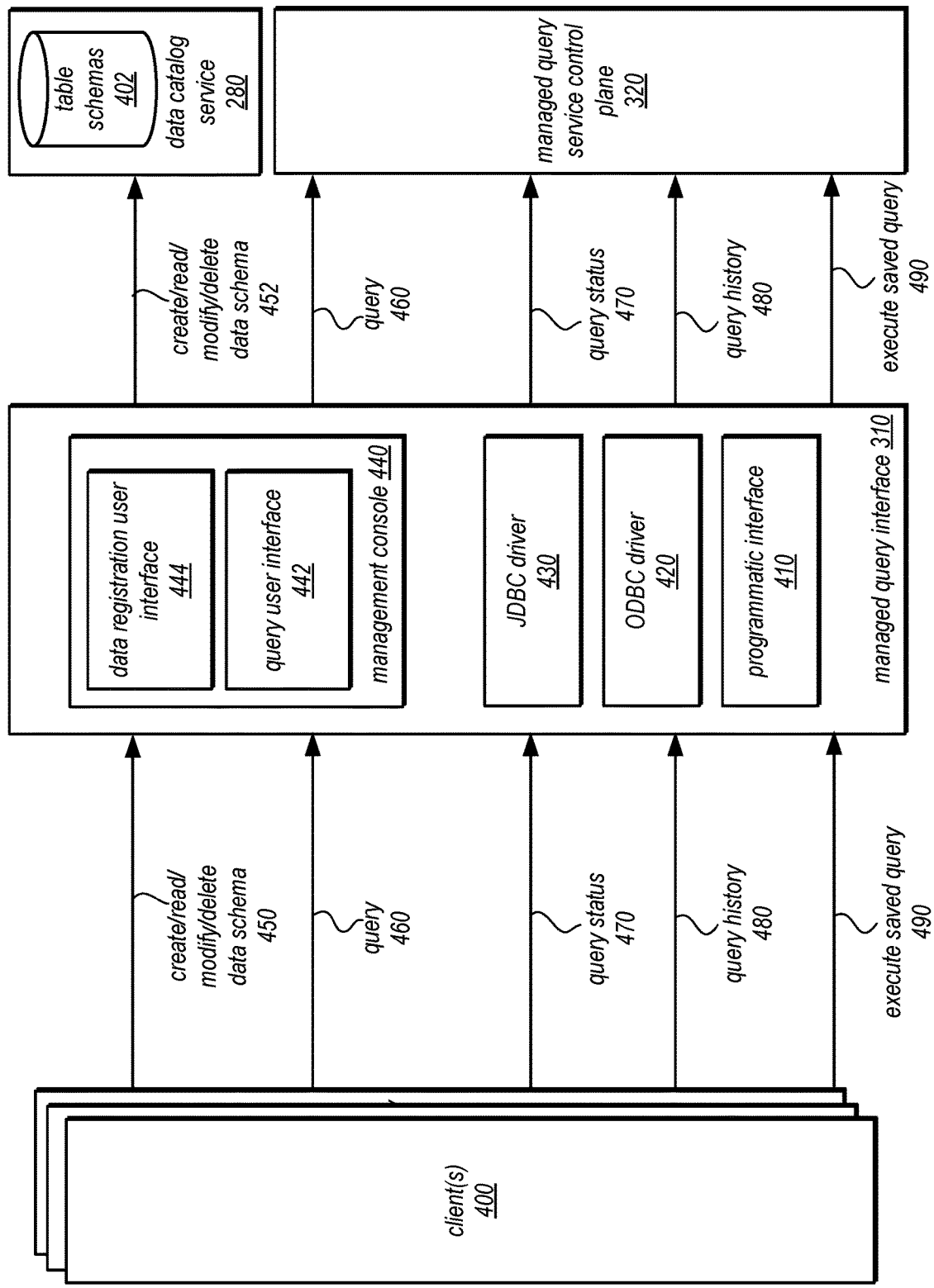
FIG. 4 is a diagram illustrating interactions between clients and managed query service, according to some embodiments.

FIG. 4 is a diagram illustrating interactions between clients and managed query service, according to some embodiments. Client(s) 400 may be client(s) 250 in FIG. 2 above or other clients (e.g., other services systems or components implemented as part of provider network 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provider a user interface to submit queries 442 (e.g., graphical or command line user interfaces) or register data schemas 444 for executing queries. For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of request to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/deserializers), partitions of a data set (e.g., according to time, geographic location, or other dimensions), or any other schema information for process queries with respect to data sets, in various embodiments. In at least some embodiments, request to create/read/modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIG. 5. Queries 460 may be formatted according to various types of query languages, such as Structured Query Language (SQL) or HQL.

Client(s) 400 may also submit requests for query history 480 or other account related query information (e.g., favorite or common queries) which managed query. In some embodiments, client(s) 400 may programmatically trigger the performance of past queries by sending a request to execute a saved query 490, which managed query service control plane 320 may look-up and execute. For example, execute saved query request may include a pointer or other identifier to a query stored or saved for a particular user account or client. Managed query service control plane 320 may then access that user query store to retrieve and execute the query (according to techniques discussed below with regard to FIG. 5).

Figure 5:
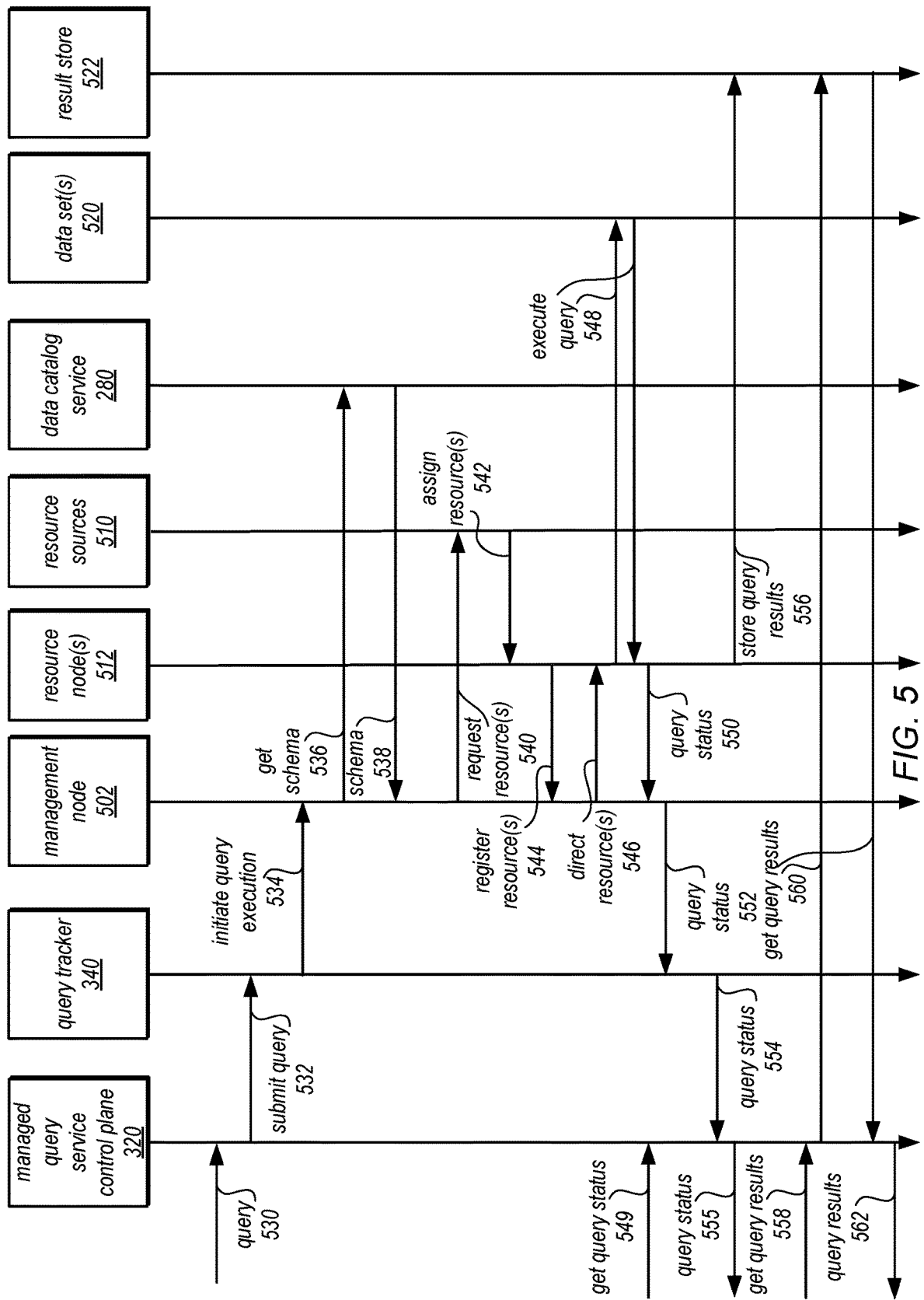
FIG. 5 is a sequence diagram for managed execution of queries independent resource scheduling, according to some embodiments.

FIG. 5 is a sequence diagram for managed execution of queries independent resource scheduling, according to some embodiments. Query 530 may be received at managed query service control plane 320 which may submit the query 632 to query tracker 340. Query tracker 340 may launch or otherwise initiate a management node 502 (which may be obtained from a pool computing nodes or other hosts that can implement a distributed query execution platform to perform the received query 530). For example, query tracker 340 may send sending a query execution instruction to a managed query agent implemented at a resource host to configured, provision, initiate, and/or otherwise launch the management process for a distributed query execution platform as management node 502, in some embodiments.

Figure 6:
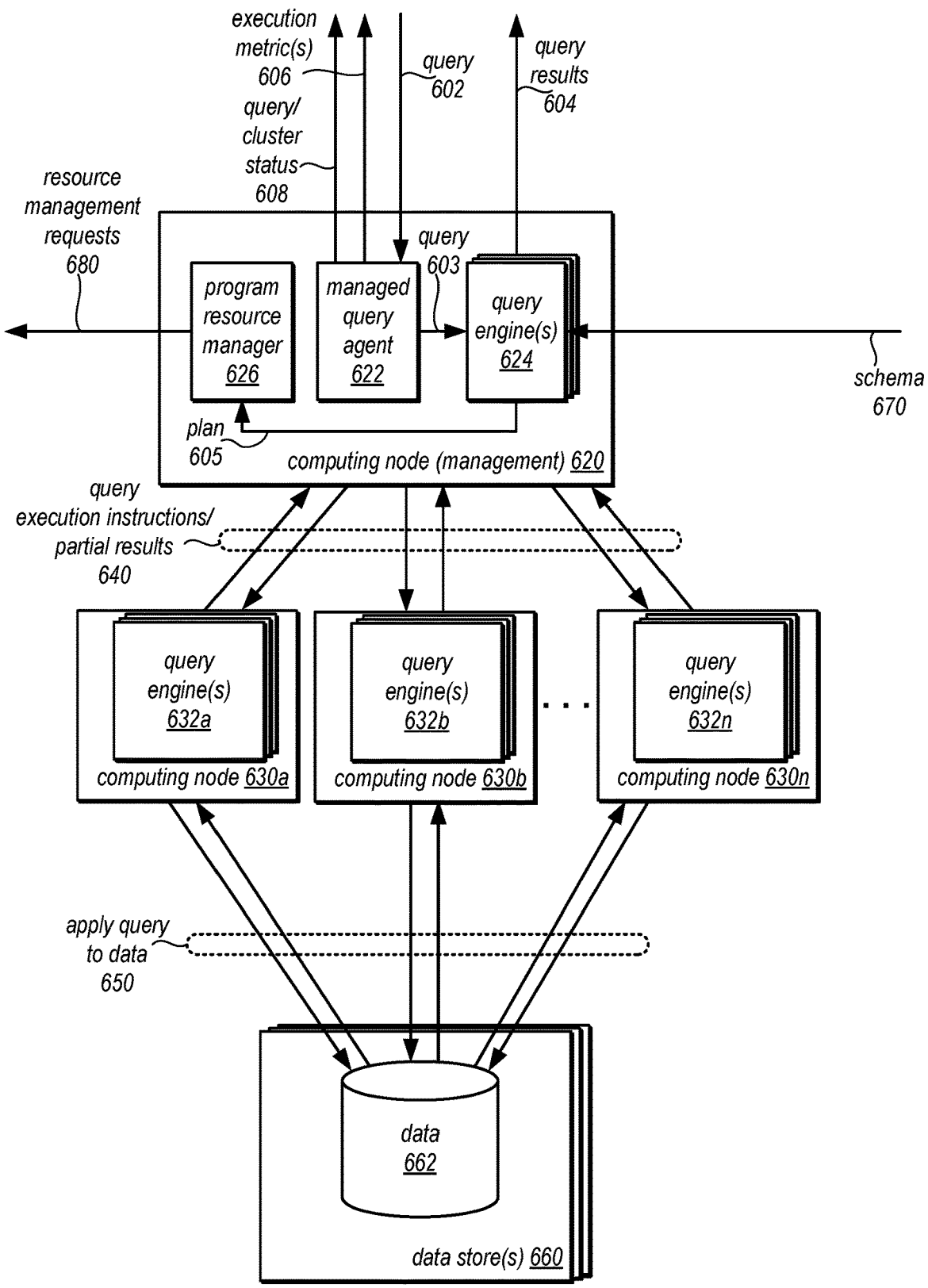
FIG. 6 is a logical block diagram illustrating a management node interacting with resources obtained according to independent resource scheduling for processing a query as part of managed query execution, according to some embodiments.

Management node 502 may get schema 536 (e.g., via a managed query agent at the same host as illustrated in FIG. 6) for the data sets(s) 520 from data catalog service 280, which may return the appropriate schema 538, in some embodiments. Management node 502 can then generate a query execution plan and request resources 540 from resource sources 510 (e.g., via a resource manager at the same host as illustrated in FIG. 6). Resource sources 510 (e.g. other network-based services or pools of resources discussed above in FIG. 4) may assign 542 resources 512 to management node 502. Resource node(s) 512 may register 544 with management node 502 to notify management node 502 that the resources nodes are available to perform work. Management node 290 may then direct the resources 544 to execute the query 548 with respect to data set(s) 520 according to the query plan. As discussed above with regard to FIG. 1, different resources may be obtained to execute different portions of a distributed data processing program, like a distributed query. Therefore, the interactions to request resources 540, assign resources 542, register resources 544 and direct resources 546 may be performed multiple times for different portions of the query identified according to corresponding portions of the query plan.

Management node 502 may receive query status 550 from resource node(s) 512, send query status 552 to query tracker 340 which may report query status 554 in response to get query status 549 request, sending a response 555 indicating the query status, in some embodiments. In some embodiments, resource node(s) 512 that perform portions of the query that generate final results may store the final query results 556 in a result store 522 (which may be a data storage service 230), in some embodiments. Managed query service control plane 320 may receive a request to get query results 558 and get query results 560 from results store 522 and provide the query results 562 in response, in some embodiments.

FIG. 6 is a logical block diagram illustrating a management node interacting with resources obtained according to independent resource scheduling for processing a query as part of managed query execution, according to some embodiments. Computing node 620 may be a management node in order to perform leader, coordinator, or other operations to perform a query (according to the query engine 624 implemented by computing node 620). Managed query agent 622 may be implemented as part of management node 620 in order to provide an interface between the management node 620, and other components of managed query service 270. For example, managed query agent 622 may provide further data to managed query service 270, such as the status 608 of the query (e.g. executing, performing I/O, performing aggregation, etc.,) and execution metrics 606 (e.g., health metrics, resource utilization metrics, cost metrics, length of time, etc.)

Management node 620 may implement query engine 624 to execute queries, such as query 602 which may be received via managed query agent 622 as query 603. For instance, managed query agent may implement a programmatic interface for query tracker to submit queries (as discussed above in FIG. 5), and then generate and send the appropriate query execution instruction to query engine 624. Query engine 624 may generate a query execution plan for received queries 603. In at least some embodiments, management node 620, may obtain schema information for the data set(s) 670 from the data catalog service 280 or metadata stores for data 662 (e.g., data dictionaries, other metadata stores, other data processing services, such as database systems, that maintain schema information) for data 662, in order to incorporate the schema data into the generation of the query plan and the execution of the query. Query engine(s) 624 may provide the plan 605 to program resource manager 626 in order to perform resource management requests 680, as discussed in detail below. In some embodiments, query engine(s) 624 may invoke or otherwise communicate with program resource manager 626 in order to obtain resources for performing different portions of the query. For example, program resource manager 626 may be implemented as a library or other resource that can be invoked by the code or instructions implementing query engine(s) 624 to perform various independent resource scheduling techniques, as discussed below with regard to FIGS. 9-11.

Once resources are obtained for performing a portion of the query, management node 620 may generate and send query execution instructions 640 to computing nodes that access and apply the query to data 662 in data store(s) 660. Compute nodes, such as nodes 630a, 630b, and 630n, may respectively implement query engines 632a, 632b, and 632n to execute the query instructions, apply the query to the data 650, and return partial results 640 to management node 620, which in turn may generate and send query results 604. Query engine 624 and query engines 632 may implement various kinds of distributed query or data processing frameworks, such as the open source Presto distributed query framework or the Apache Spark framework.

Figure 7:
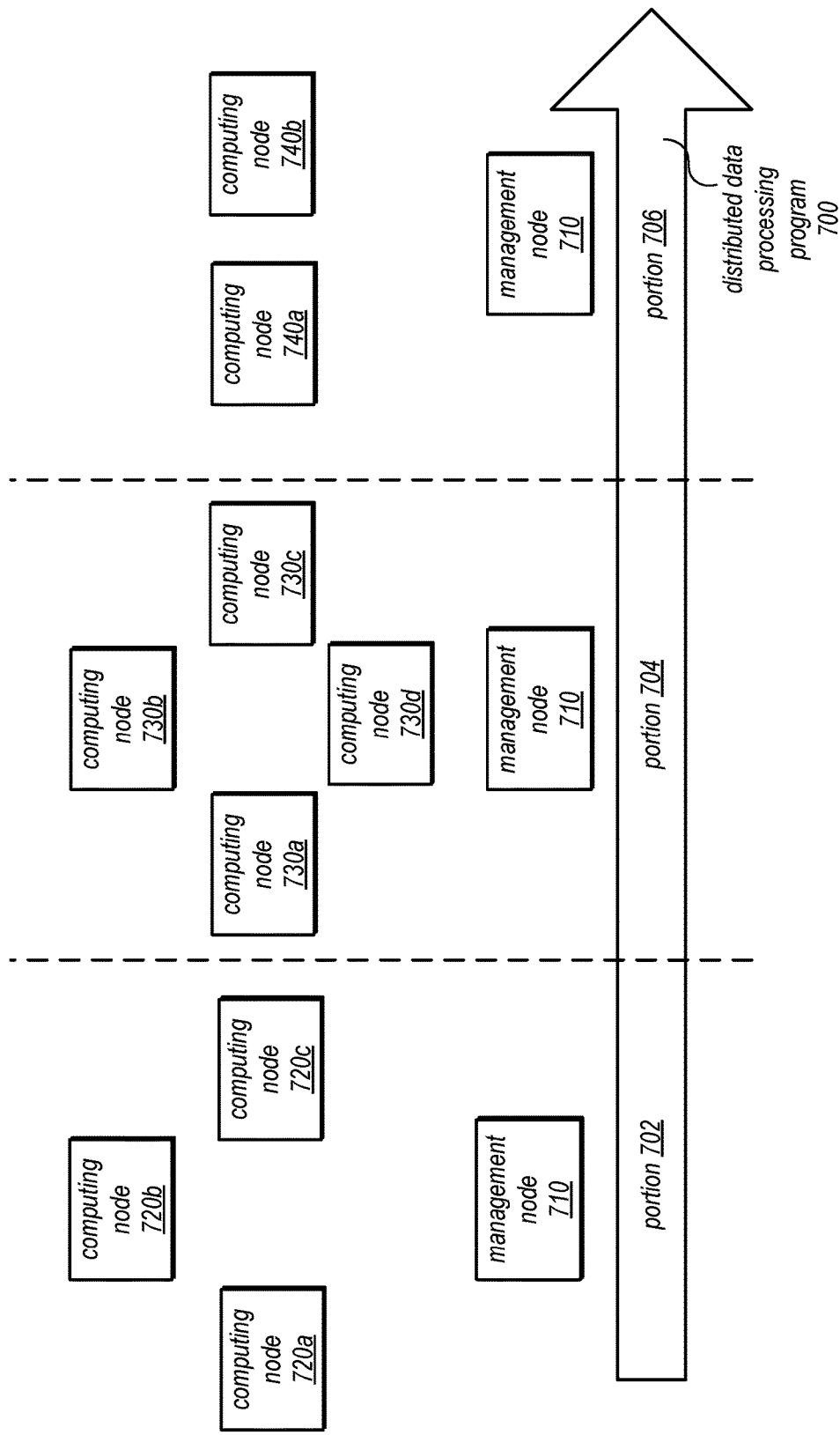
FIG. 7 is a logical block diagram illustrating changes to obtained resources for performing different portions of a distributed data processing program, according to some embodiments.

FIG. 7 is a logical block diagram illustrating changes to obtained resources for performing different portions of a distributed data processing program, according to some embodiments. The types of operations performed for a distributed data processing program, like a distributed query, may change over time. Although FIG. 6 illustrates a set of resources performing query instructions and executions to a set of resources, the set of resources receiving and responding to the instructions may change over time. In FIG. 7, different portions of a distributed data processing program 700 (e.g., to perform a query as discussed above in FIGS. 5 and 6), such as portions 702, 704, and 706, may utilize different sets of computing resources to perform the respective portions.

Portion 702, for instance may utilize three computing nodes 720a, 720b, and 720c. These computing nodes 720 may be obtained from the same or different service or other source and may share the same or varying performance characteristics and attributes (e.g., the same or varying processing capacity, memory capacity, storage capacity, network bandwidth, hardware devices, etc.). The next portion of distributed data processing program 700, however may utilize entirely (or at least some) different computing resources. Computing nodes 730a, 730b, 730c, and 730d may have different performance capabilities than those of computing nodes 720, in some embodiments. Similarly, computing nodes 740a and 740b may perform the portion 706 of distributed data processing program 700 with varying capabilities and performance characteristics than other computing nodes.

Management node 710 can maintain or preserve the state of distribute data processing program 700 across changes in resources performing the work of distributed data processing program 700. In this way, distributed data processing program 700 can utilize different computing resources according to its needs, rather than the available performance capabilities and characteristics of a static cluster of resources assigned to the distributed data processing program 700 for the duration of the distributed data processing program 700.

Figure 8:
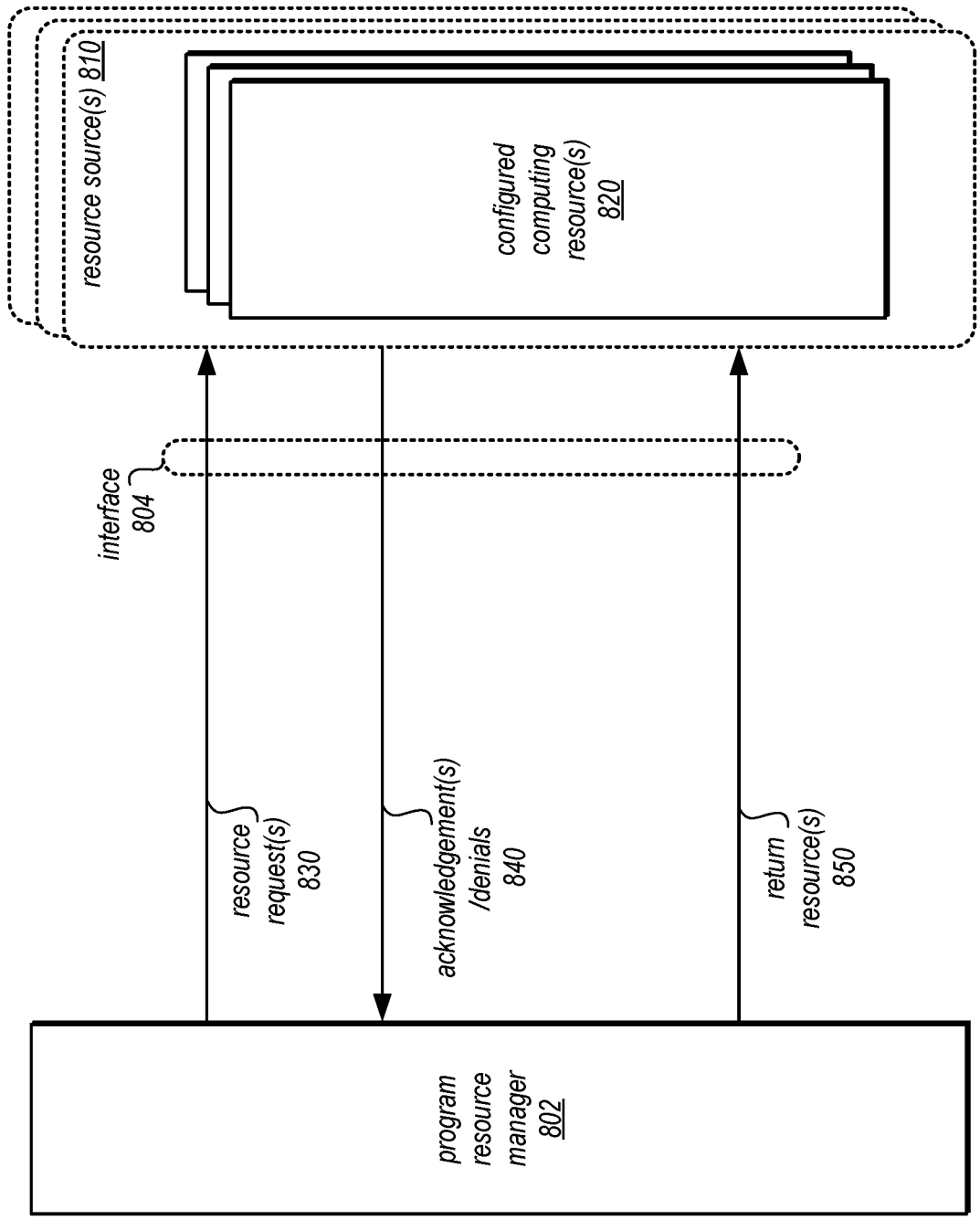
FIG. 8 is logical block diagram illustrating interactions between a resource manager of a management node and pools of resources, according to some embodiments.

FIG. 8 is logical block diagram illustrating interactions between a resource manager of a management node and pools of resources, according to some embodiments. As discussed above in FIG. 6, a resource manager for a management node may make resource management requests to obtain or release resources on behalf of the management node performing the query. For example, FIG. 8 illustrates a program resource manager 802, similar to program resource manager 626 in FIG. 6.

Program resource manager 802 may submit resource requests 830 to resource sources 810 via an interface 804 for resources 810 in order to obtain a configured computing resource 820 offered by the resource source 820. Interface 804 may be a programmatic interface (e.g., API) via which network requests may be submitted. In some embodiments, different resource sources 810 may be different provider network services, and thus program resource manager 802 may be able to generate and send the resources request 830 to the different services according to the different respective programmatic interfaces. Resource requests 802 may identify a number, type, configuration (e.g., type of query engine platform) for the resources. For example, a resource request for resources with hardware optimized operation capabilities (e.g., FPGA enabled resources that may be configured to perform encoding, image processing, or other optimized data processing operations), may be sent. As indicated at 840, the resource sources 810 may acknowledge or deny the requests 840. Acknowledgements may indicate the resources assigned to the management node (e.g., by including identifiers, locations, or other information to establish information). In some embodiments, acknowledgements may indicate information such as maximum assignment or utilization time for the resources. In some embodiments, the acknowledgements may identify the mechanism or protocol for returning the computing resources. Denials may be sent in the event that the desired resources are unavailable, in some embodiments. In at least some embodiments, alternative resources may be provided as part of a denial, which program resource manager 802 may accept be submitting a request 830 for the identified alternative resources.

A request to return resources 850 to the resource sources may also be sent, in some embodiments. As discussed below with regard to FIG. 11, when resource(s) are no longer needed to perform work for the distributed data processing program, they may be returned or released for performing other work. Prior to returning the resources, program resource manager 802 may perform various cleanup operations on the resources (e.g., memory scrubbing, process or application restarts, etc.) to prepare the resource to perform different work, in some embodiments. In some embodiments, the release resources may self-report that they are available and/or returning to a resource source.

Figure 9:
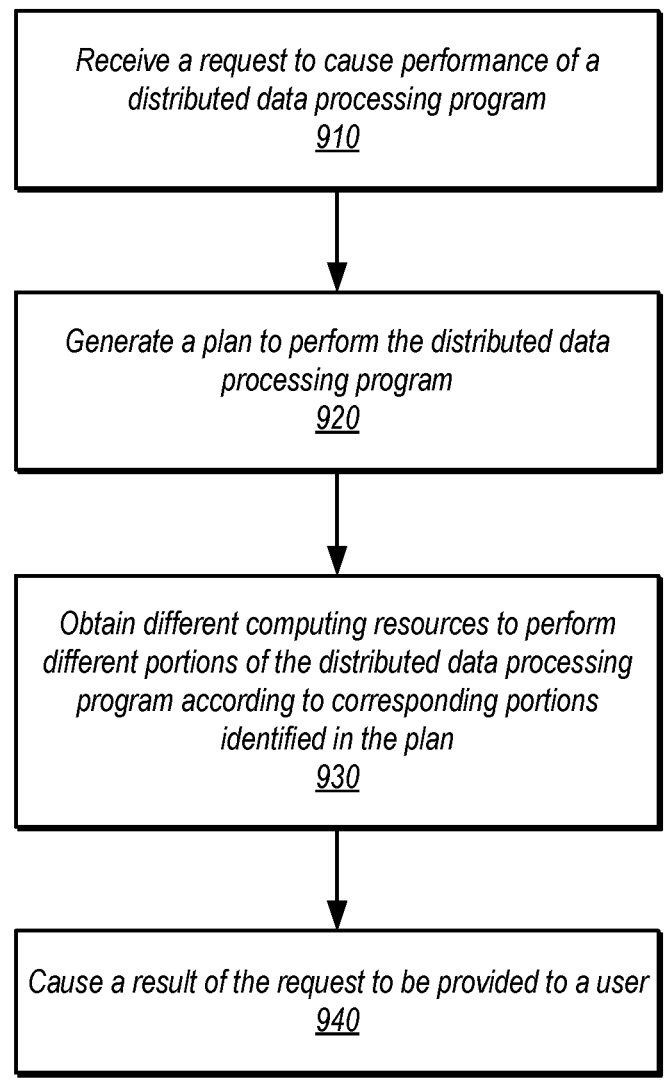
FIG. 9 is a high-level flowchart illustrating various methods and techniques to implement independent resource scheduling for distributed data processing programs, according to some embodiments.

Although FIGS. 2-8 have been described and illustrated in the context of a managed query service that implements independent resource scheduling for distributed data processing programs, the various components illustrated and described in FIGS. 2-8 may be easily applied to other systems, or devices that perform distributed data processing programs. As such, FIGS. 2-8 are not intended to be limiting as to other embodiments of a system that may implement independent resource scheduling for distributed data processing programs. FIG. 9 is a high-level flowchart illustrating various methods and techniques to implement independent resource scheduling for distributed data processing programs, according to some embodiments. Various different systems and devices may implement the various methods and techniques described below, either singly or working together. For example, a managed query service or other network service as described above with regard to FIGS. 2-8 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 910, a request to cause performance of a distributed data processing program may be received, in various embodiments. For example, a request to cause performance of a distributed data processing program may be a request to execute previously supplied code, scripts, executables or other information. A management node may, for example, store or have access to the code, scripts, executables or other information to perform the distributed data processing program, in some embodiments. In some embodiments, the request may be like the requests to perform queries discussed above with regard to FIGS. 2-8 for a managed query service, where the request triggers the launch of a management node that implements a query engine or other distributed query processing platform to perform the query. Other types of distributed data processing applications, such as Extract Transform Load (ETL), data conversion, or analytics may be performed, in some embodiments.

As indicated at 920, a plan to perform the distributed data processing program may be generated, in various embodiments. For example, if the distributed data processing program is a query or other executable script, then the query or script may be parsed, compiled, or otherwise analyzed to determine the operations or tasks defined in the query and a workflow, decision tree, or other structure linking the operations to be performed may be created. The plan may identify how to distribute the operations amongst distributed computing resources, such as assigning resources to read distributed data according to a distribution scheme (e.g., such as a hash-based distributed scheme or range-based distributed scheme).

As indicated at 930, different computing resources may be obtained to perform different portions of the distributed data processing program according to corresponding portions identified in the plan, in various embodiments. For example, once the plan is generated, the operations or tasks may be mapped to types of computing resources optimal for perform the task (e.g., high processor capacity for computationally expensive tasks, high memory capacity for aggregating or joining large amounts of data, high bandwidth for reading or writing data, etc.). The resources may be obtained dynamically by requesting resources as they are needed during the performance of the distributed data processing program according to the plan (e.g., as discussed below with regard to FIG. 10). In some embodiments, the resources for the different portions of the plan may be obtained prior to performance of the distributed data processing program in order to stage or pipeline resources for performing the distributed data processing program. As discussed above with regard to FIG. 8 and below with regard to FIG. 10, requests to different sources for resources may be made in order to obtain the rights to utilize the resources for performing the portions of the distributed data processing program.

The plan to perform the distributed data processing program may be performed as the resources are obtained, in various embodiments. As indicated at 940, a result of the request may be provided to a user, in some embodiments. For example, an acknowledgement that the distributed data processing program completed or results of a query may be provided to a user. In some embodiments, the request may be provided using a same interface as the interface via which the request to cause performance of the distributed data processing program was received.

Figure 10:
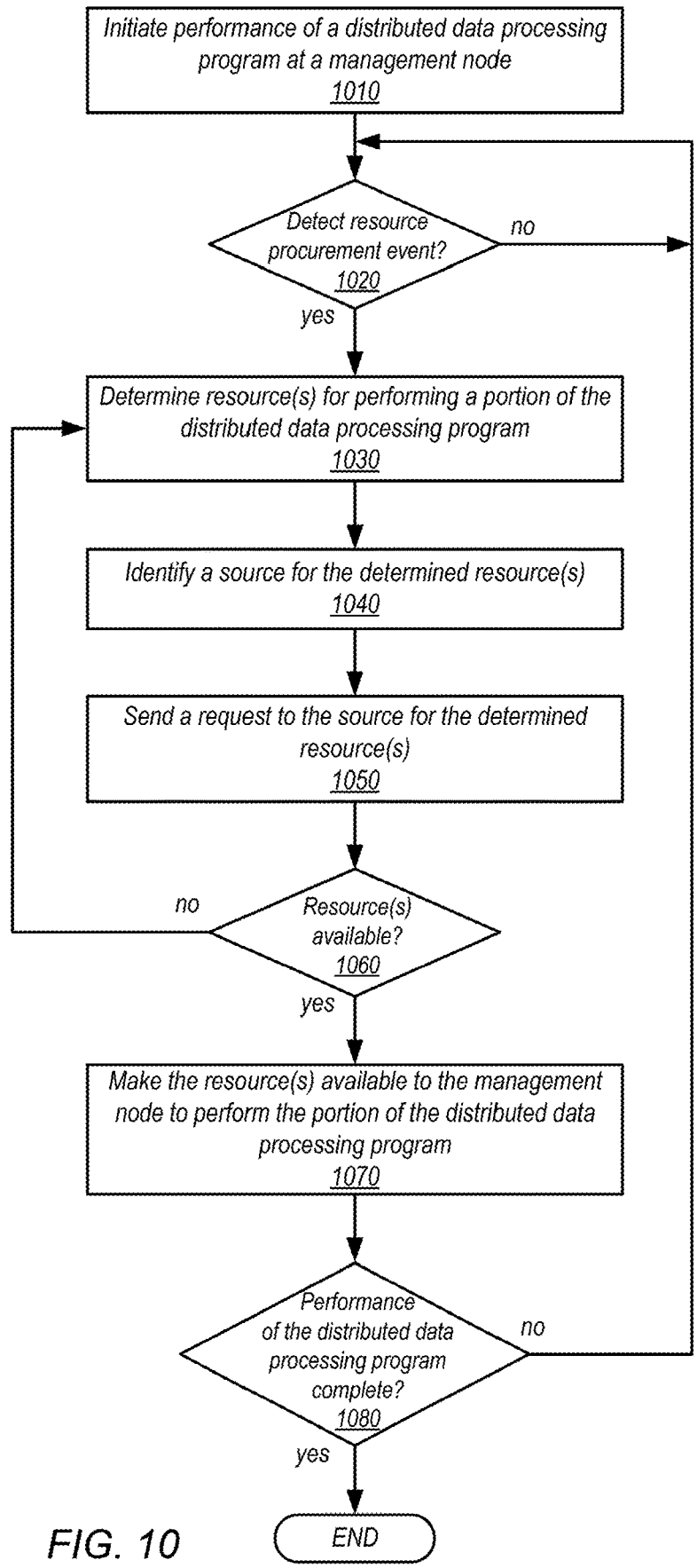
FIG. 10 is a high-level flowchart illustrating various methods and techniques to handle resource procurement events for a distributed data processing program, according to some embodiments.

FIG. 10 is a high-level flowchart illustrating various methods and techniques to handle resource procurement events for a distributed data processing program, according to some embodiments. As indicated at 1010, performance of a distribute data processing program may be initiated at a management node, in various embodiments. For example, managed execution service for distributed data processing, such as managed query service 270 as discussed above, may provision, assign, or otherwise identify a computing resource to host or launch a management process for performing a distributed data processing program (e.g. launch the coordinator, leader, or other management role that begins preparations to execute the distributed data processing program). Performance of various management tasks may commence, including generation of a plan to perform the distributed data processing program, as discussed above with regard to FIG. 9.

As indicated at 1020, a resource procurement event may be detected, in some embodiments. A resource procurement event may be detected according to criteria or conditions for performing the distributed data processing program. If, for instance, performance of the plan for the distributed data processing program identifies initial operations and tasks to be performed in distributed fashion by one or more other computing resources, then the procurement event may be triggered when the management node is ready to assign those initial operations and tasks, in some embodiments. In some embodiments, resource procurement for different portions of a distributed data processing may be performed after plan generation at the same or substantially the same time so that resources can be obtained for distributed data processing program before the portion which may utilize the resources is ready to be performed. Resource procurement events may also be dynamically detected as a prior portion of distributed data processing program completes, in some embodiments. For example, the management node may signal to a resource manager for the management node that a portion of the distributed data application program completed and the management node is ready to distribute work to resources for the next portion of the distributed data processing program.

As indicated at 1030, the resource(s) for performing a portion of the distributed data processing program corresponding to the procurement event may be determined, in various embodiments. Different selection criteria based on resource capabilities to satisfy cost, performance, or other execution object may be evaluated, in some embodiments. For example, a portion of the plan to perform the distributed data processing program may indicate the operations to be performed (e.g., scanning operations, analysis operations, modification operations, etc.). The indicated operations may be matched to types and/or numbers of resources that optimally perform the operations (e.g., large numbers of small processing capacity resources to perform scans, high processing capacity resources to perform analysis, hardware accelerated resources to perform data modifications, such as compression or other forms of encoding, etc.). Cost thresholds may be used, in some embodiments, to select resources that do not exceed user-specified cost limits. Similarly, users may specify the performance objectives (e.g., throughput, latency, time to completion, etc.) which may be evaluated as part of the selection criteria. In some embodiments, the plan may explicitly identify a number and/or type of resources.

As indicated at 1040, a source for the determined resource(s) may be identified, in some embodiments. For example, resource pools, network-based services, or other resource listings may be provided to a resource manager (e.g., by periodically polling known resource sources or by accessing a preconfigured list or registry of resource sources). The types of resources offered by the different sources may be matched with the determined resources in order to identify one (or more) of the sources from which the determined resources can be obtained. In some embodiments, the same resources can be offered by multiples sources and time to utilize, cost, availability, and other criteria may be used to select one of the sources. As indicated at 1050, a request may be sent to the source for the determined resources, in some embodiments. For example, a request may be formatted according to an API or other interface for the source identifying a number and type of desired resources. In some embodiments, the request may identify the management node as the recipient of the resources so that the sources may directly assign or allocate the resources to the management node. In other embodiments, resource assignments (e.g., identifiers of resources made available to the management node may be returned to a resource manager for the management node).

Requested resources may not always be available. As indicated at 1060, in some embodiments, if resources are not available an alternative resource and/or source selection may be made. In some embodiments, the source may propose alternative resource assignments, which the resource manager may accept or reject. If the resources are available, then the resources may be made available to the management node to perform the portion of the distributed data processing program, as indicated at 1070, in various embodiments. For example, the resources may be directed to check in or register with the management node to indicate that the resource is ready to begin work. In some embodiments, the locations (e.g., network address), identifiers, or other information for establishing communication with the assigned resources may be provided to either the resource manager which can provide it to the management node or to the management node directly.

As discussed above, resource procurement events may allow for resource allocation and assignment to a distributed data processing program to be performed dynamically. As indicated at 1080, different portions of a distributed data processing program may obtain access to and utilize different sets of resources over time, as discussed above with regard to FIG. 7. In this way, the resources assigned to a distributed data processing program are not static but may be adapted to suit the performance goals of the distributed data processing programs and the availability of resources in environments where many different distributed data processing programs are utilizing resources from common sources. When performance of the distributed data processing program is complete, as indicated by the positive exit from 1080, then resource procurement events may no longer be detected.

Figure 11:
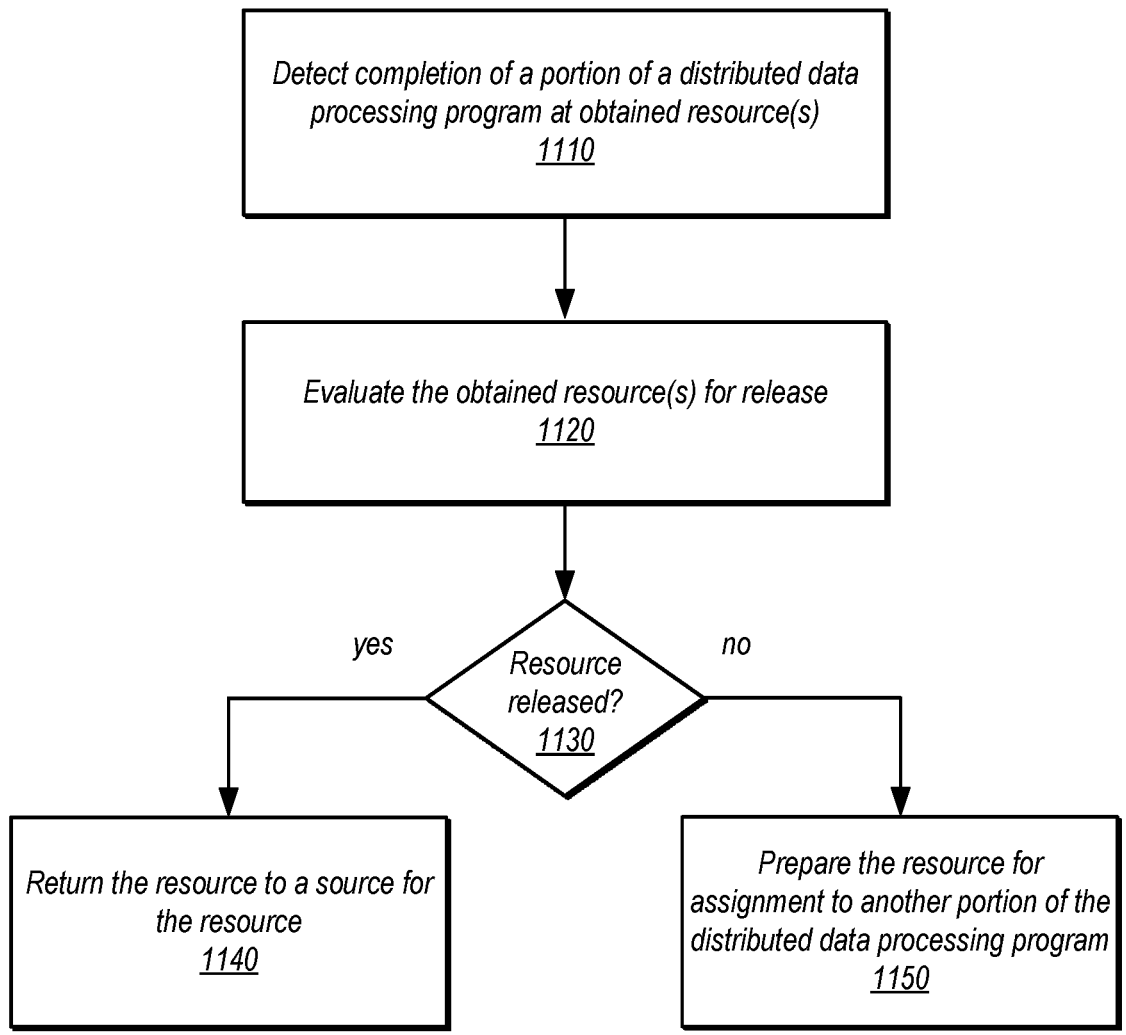
FIG. 11 is a high-level flowchart illustrating various methods and techniques to release resources obtained for performing distributed data processing programs, according to some embodiments.

FIG. 11 is a high-level flowchart illustrating various methods and techniques to release resources obtained for performing distributed data processing programs, according to some embodiments. As indicated at 1110, completion of a portion of a distributed data processing program at obtained resource(s) may be detected, in some embodiments. For example, a management process, execution platform, or other execution coordinator for the distributed data processing program may receive completion indications from the resources or desired results for the portion of the program assigned to the resource(s), in some embodiments. A resource manager may receive a notification of completion from the management process (or may receive the completion notification directly from the obtained resources), in some embodiments.

As indicated at 1120, the obtained resource(s) may be evaluated for release, in various embodiments. For example, upcoming resource procurements for the distributed data processing program may be evaluated to determine whether any of the resources have desired performance characteristics or capabilities for the upcoming portions of the distributed data processing program for which resources are being procured. If, for instance, a high processing capacity resource completes work on a portion and another portion of the distributed data processing application also can optimally leverage the high processing capacity resource, then the high processing capacity resource may not be released (even if the resource may be idle for a period of time). Release evaluations may be performed individually for each resource, in some embodiments. In this way, release decisions can be made with high granularity, in order to prevent obtained resources from being underutilized for other work for other distributed data processing programs, for instance.

If a resource is identified for release, as indicated by the positive exit from 1130, then the resource may returned to a source for the resource, as indicated at 1140. For example, as discussed above with regard to FIG. 8, an indication or other communication may be provided to a network-based service, pool, or other control plane for the resource to identify the resource as available to be assigned to other managed nodes (or other tasks). In some embodiments, cleanup operations to remove data or other information associated with the portion of the distributed data processing program may be performed (e.g., scrubbing memory, resetting configuration settings, etc.). In at least some embodiments, the resource may be restarted or refreshed (e.g., refreshing the software container for resources that are implemented using container-based virtualization).

If a resource is not identified for release, as indicated by the negative exit from 1130, then the resource may be prepared for assignment to another portion of the distributed data processing program, as indicated at 1150. For example, operations to configure the resource, provide access or security credentials, establish network connections, register or link the resource to a management node or other resource performing the distributed data processing program may be performed, in some embodiments.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may be configured to implement the functionality described herein. The various methods as illustrated in the figures and described herein represent example embodiments of methods. The order of any method may be changed, and various elements may be added, reordered, combined, omitted, modified, etc.

Figure 12:
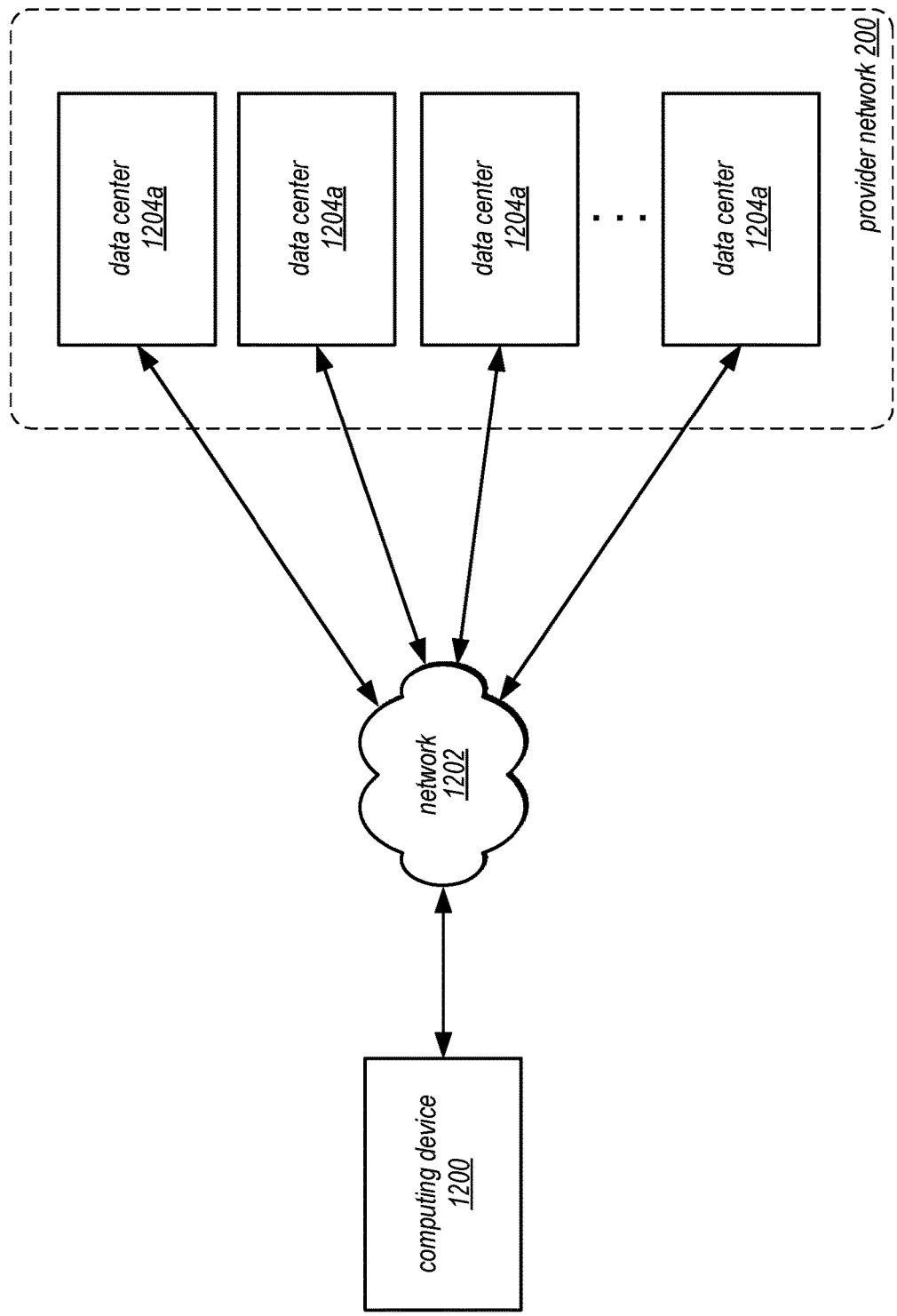
FIG. 12 is a logical block diagram that shows an illustrative operating environment that includes a service provider network that can be configured to implement aspects of the functionality described herein, according to some embodiments.

FIG. 12 is a logical block diagram that shows an illustrative operating environment that includes a service provider network that can implement aspects of the functionality described herein, according to some embodiments. As discussed above, the service provider network 200 can provide computing resources, like compute instances and storage, on a permanent or an as-needed basis. Among other types of functionality, the computing resources provided by the service provider network 200 can be utilized to implement the various services described above. As also discussed above, the computing resources provided by the service provider network 200 can include various types of computing resources, such as data processing resources like compute instances, data storage resources, networking resources, data communication resources, network services, and the like.

Each type of computing resource provided by the service provider network 200 can be general-purpose or can be available in a number of specific configurations. For example, data processing resources can be available as physical computers or compute instances in a number of different configurations. The compute instances can execute applications, including web servers, application servers, media servers, database servers, some or all of the services described above, and/or other types of programs. The compute instances can also be configured into computing clusters in the manner described above. Data storage resources can include file storage devices, block storage devices, and the like. The service provider network 200 can also provide other types of computing resources not mentioned specifically herein.

The computing resources provided by the service provider network maybe implemented, in some embodiments, by one or more data centers 1204A-1204N (which might be referred to herein singularly as "a data center 1204" or in the plural as "the data centers 1204"). The data centers 1204 are facilities utilized to house and operate computer systems and associated components. The data centers 1204 typically include redundant and backup power, communications, cooling, and security systems. The data centers 1204 can also be located in geographically disparate locations. One illustrative configuration for a data center 1204 that can be utilized to implement the technologies disclosed herein will be described below with regard to FIG. 13.

The customers and other users of the service provider network 200 can access the computing resources provided by the service provider network 200 over a network 1202, which can be a wide area communication network ("WAN"), such as the Internet, an intranet or an Internet service provider ("ISP") network or a combination of such networks. For example, and without limitation, a computing device 1200 operated by a customer or other user of the service provider network 200 can be utilized to access the service provider network 200 by way of the network 1202. It should be appreciated that a local-area network ("LAN"), the Internet, or any other networking topology known in the art that connects the data centers 1204 to remote customers and other users can be utilized. It should also be appreciated that combinations of such networks can also be utilized.

Figure 13:
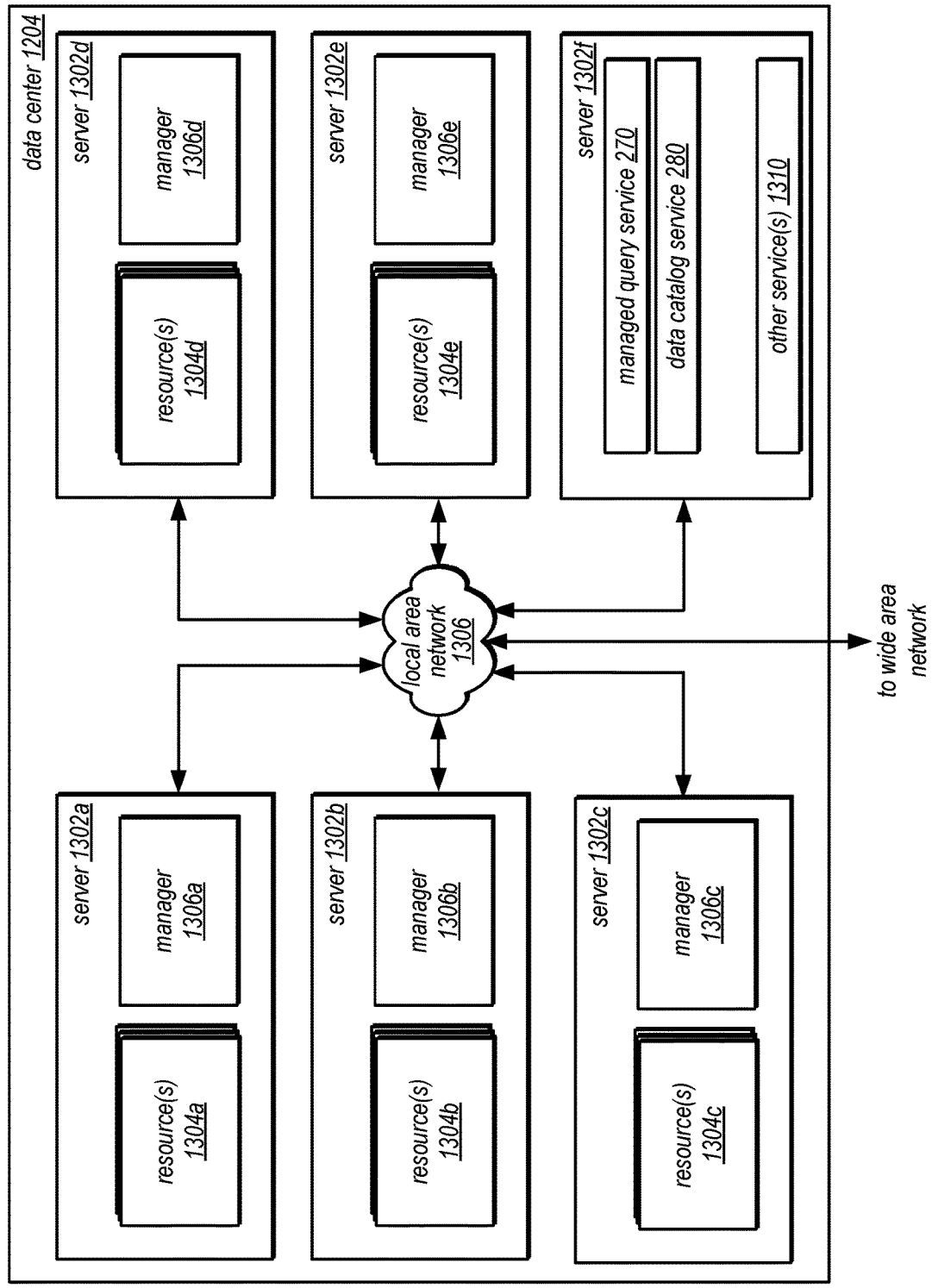
FIG. 13 is a logical block diagram illustrating a configuration for a data center that can be utilized to implement aspects of the technologies disclosed herein, according to some embodiments.

FIG. 13 is a logical block diagram illustrating a configuration for a data center that can be utilized to implement aspects of the technologies disclosed herein, according to various embodiments. is a computing system diagram that illustrates one configuration for a data center 1204 that implements aspects of the technologies disclosed herein for providing managed query execution, such as managed query execution service 270, in some embodiments. The example data center 1204 shown in FIG. 13 includes several server computers 1302A-1302F (which might be referred to herein singularly as "a server computer 1302" or in the plural as "the server computers 1302") for providing computing resources 1304A-1304E.

The server computers 1302 can be standard tower, rackmount, or blade server computers configured appropriately for providing the computing resources described herein (illustrated in FIG. 13 as the computing resources 1304A-1304E). As mentioned above, the computing resources provided by the provider network 200 can be data processing resources such as compute instances or hardware computing systems, computing clusters, data storage resources, database resources, networking resources, and others. Some of the servers 1302 can also execute a resource manager 1306 capable of instantiating and/or managing the computing resources. In the case of compute instances, for example, the resource manager 1306 can be a hypervisor or another type of program may enable the execution of multiple compute instances on a single server computer 1302. Server computers 1302 in the data center 1204 can also provide network services and other types of services, some of which are described in detail above with regard to FIG. 2.

The data center 1204 shown in FIG. 13 also includes a server computer 1302F that can execute some or all of the software components described above. For example, and without limitation, the server computer 1302F can execute various components for providing different services of a provider network 200, such as the managed query service 270, the data catalog service 280, resource management service 290, and other services 1310 (e.g., discussed above) and/or the other software components described above. The server computer 1302F can also execute other components and/or to store data for providing some or all of the functionality described herein. In this regard, it should be appreciated that the services illustrated in FIG. 13 as executing on the server computer 1302F can execute on many other physical or virtual servers in the data centers 1204 in various configurations.

In the example data center 1204 shown in FIG. 13, an appropriate LAN 1306 is also utilized to interconnect the server computers 1302A-1302F. The LAN 1306 is also connected to the network 1202 illustrated in FIG. 12. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1204A-1204N, between each of the server computers 1302A-1302F in each data center 1204, and, potentially, between computing resources in each of the data centers 1204. It should be appreciated that the configuration of the data center 1204 described with reference to FIG. 13 is merely illustrative and that other implementations can be utilized.

Figure 14:
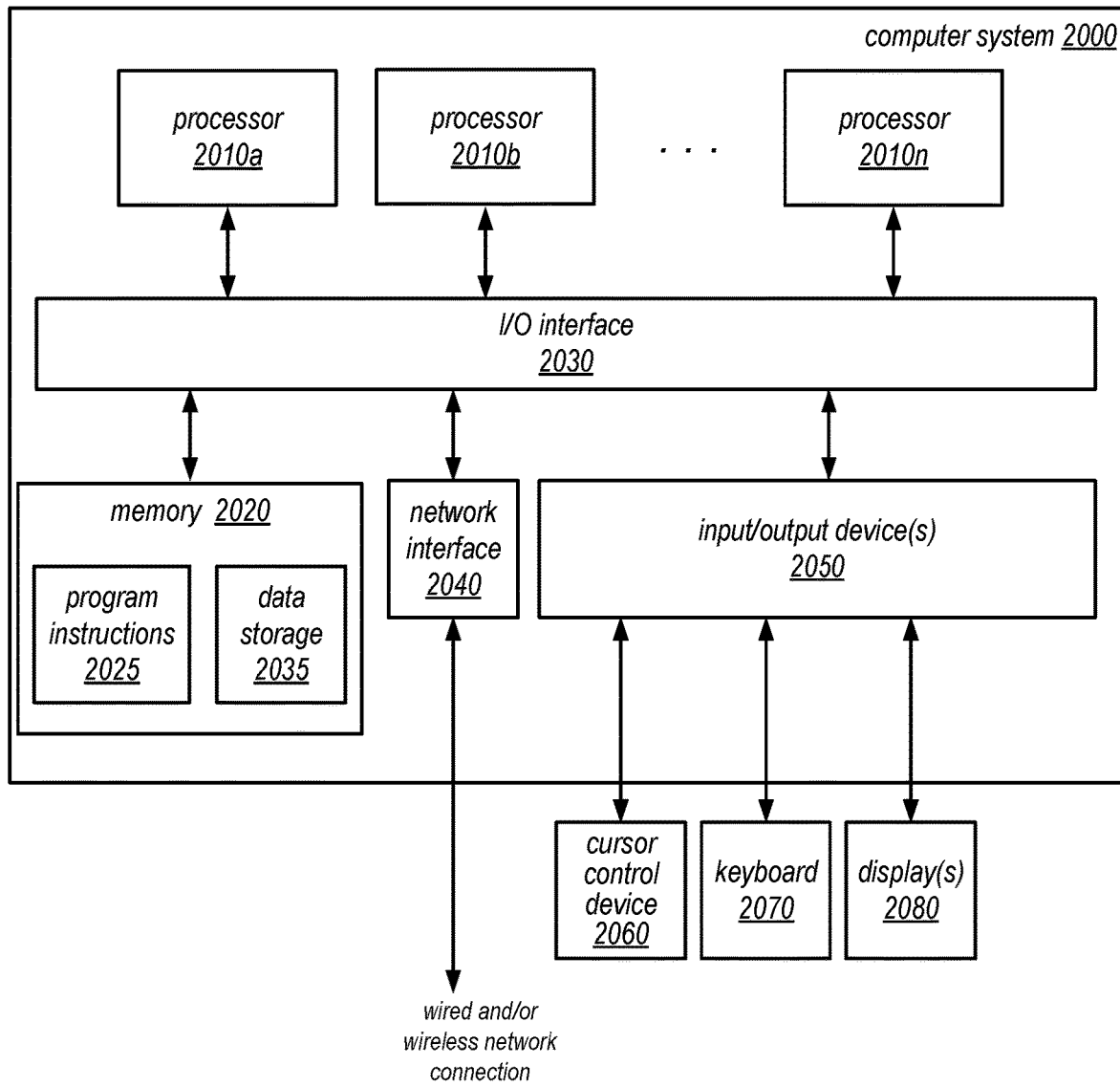
FIG. 14 illustrates an example system configured to implement the various methods, techniques, and systems described herein, according to some embodiments.

Embodiments of s independent resource scheduling for distributed data processing programs as described herein may be executed on one or more computer systems, which may interact with various other devices. One such computer system is illustrated by FIG. 14. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 14, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, when performed by at least one processor, cause the at least one processor to perform a method to at least:
receive a request to cause performance of a distributed data processing program;
generate a plan to perform the distributed data processing program;
determine different computing resources to perform different portions of the distributed data processing program according to corresponding portions identified in the plan;
send requests to obtain the different computing resources from one or more pools of computing resources during performance of the distributed data processing program, wherein at least one of the requests is sent when detecting completion of performance of one of the different portions of the distributed data processing program, and wherein, when detecting completion of the performance of the one of the different portions, one of the different computing resources is re-assigned for performing a next one of the different portions of the distributed data processing program according to the plan or returned to the one or more pools of computing resources;
perform the distributed data processing program using the obtained computing resources; and
provide a result of the request.

2. The system of claim 1, wherein the program instructions cause the at least one processor to further perform the method to at least:
in response to the receipt of the request to cause the performance of the distributed data processing program, launch a management node to perform the distributed data processing program;
wherein the management node performs the generation of the plan to perform the distributed data processing program; and
wherein the management node invokes a resource manager library to obtain the different computing resources to perform the different portions of the distributed data processing program.

3. The system of claim 1, wherein the program instructions cause the at least one processor to further perform the method to at least:
after the performance of the one of the different portions of the distributed data processing program:
evaluate another computing resource from the one or more pools of computing resources to identify the another computing resource for performance of the next one of the different portions of the distributed data processing program; and
assign the another computing resource for performing the next one of the different portions of the distributed data processing program.

4. The system of claim 1, wherein the at least one processor and the memory are implemented as part of a managed query service offered by a provider network, wherein the request to cause the performance of the distributed data processing program is a request to perform a query at the managed query service, and wherein the plan generated to perform the distributed data processing program is a query plan.

5. A method, comprising:
receiving a request to cause performance of a distributed data processing program;
generating a plan to perform the distributed data processing program;
obtaining different computing resources to perform different portions of the distributed data processing program during performance of the distributed processing program, wherein, responsive to detecting completion of performance of one of the different portions, one of the different computing resources is re-assigned for performing a next one of the different portions of the distributed data processing program according to the plan or returned to a source for the one of the different computing resources; and
causing a result of the request to be provided.

6. The method of claim 5, further comprising:
in response to receiving the request to cause the performance of the distributed data processing program, launching a management node to perform the distributed data processing program;
wherein the management node performs the generating the plan to perform the distributed data processing program; and
wherein the management node invokes a resource manager library to perform the obtaining the different computing resources to perform the different portions of the distributed data processing program.

7. The method of claim 5, wherein generating the plan to perform the distributed data processing program comprises generating a directed acyclical graph (DAG) of operations to perform the distributed data processing program, wherein the different portions of the plan correspond to different portions of the DAG.

8. The method of claim 5, wherein a number of the different computing resources obtained for a first one of the different portions of the distributed data processing is different than a number of the different computing resources obtained for a second one of the different portions of the distributed data processing program.

9. The method of claim 5, further comprising:
after performing the one of the different portions of the distributed data processing program:
evaluating another computing resource from one or more sources for the different computing resources to identify the another computing resource for performance of the next one of the different portions of the distributed data processing program; and
assigning the another computing resource for performing the next one of the different portions of the distributed data processing program.

10. The method of claim 9, further comprising:
before returning the one of the different computing resources to the source, performing one or more cleanup operations at the one of the different computing resources.

11. The method of claim 5, wherein the obtaining the different computing resources to perform the different portions of the distributed data processing program according to the corresponding portions identified in the plan comprises determining the different computing resources based, at least in part, on one or more computing resource capabilities of the different computing resources evaluated with respect to one or more selection criteria.

12. The method of claim 11, wherein the obtaining the different computing resources to perform the different portions of the distributed data processing program according to the corresponding portions identified in the plan further comprises identifying one or more sources for the determined computing resources, wherein the different computing resources are obtained from the identified one or more sources.

13. The method of claim 12, wherein the identified one or more sources for the different computing resources are one or more network-based services offered by a provider network, and wherein the obtaining the different computing resources to perform the different portions of the distributed data processing program according to the corresponding portions identified in the plan further comprises sending requests to the one or more network-based services according to a respective interface for the one or more network-based services.

14. A non-transitory, computer-readable storage medium, storing program instructions that when executed by one or more computing devices cause the one or more computing devices to implement:
   receiving a request to cause performance of a distributed data processing program;
   generating a plan to perform the distributed data processing program;
   determining different computing resources to perform different portions of the distributed data processing program during performance of the distributed data processing program according to corresponding portions identified in the plan;
   obtaining the different computing resources to perform the distributed data processing program during performance of the distributed data processing program, wherein, responsive to detecting completion of performance of one of the different portions, one of the different computing resources is re-assigned for performing a next one of the different portions of the distributed data processing program according to the plan or returned to a source for the one of the different computing resources; and
   causing a result of the request to be provided.

15. The non-transitory, computer-readable storage medium of claim 14, wherein the program instructions cause the one or more computing devices to further implement identifying one or more sources for the determined computing resources, wherein the different computing resources are obtained from the identified one or more sources.

16. The non-transitory, computer-readable storage medium of claim 15, wherein the identified one or more sources for the different computing resources are one or more network-based services offered by a provider network, and wherein, in the obtaining the different computing resources, the program instructions cause the one or more computing devices to implement sending requests to the one or more network-based services according to a respective interface for the one or more network-based services.

17. The non-transitory, computer-readable storage medium of claim 14, wherein the program instructions cause the one or more computing devices to further implement:
   before determining the different computing resources to perform the different portions of the distributed data processing program:
      determining other computing resources to perform at least one of the different portions of the distributed data processing program; and
      receiving an indication that the other computing resources are unavailable for the distributed data processing program.

18. The non-transitory, computer-readable storage medium of claim 14, wherein the program instructions cause the one or more computing devices to further implement:
   in response to receiving the request to cause the performance of the distributed data processing program, launching a management node to perform the distributed data processing program;
   wherein the management node performs the generating the plan to perform the distributed data processing program; and
   wherein the management node invokes a resource manager library to perform the obtaining the different computing resources to perform the different portions of the distributed data processing program.

19. The non-transitory, computer-readable storage medium of claim 14, wherein the program instructions cause the one or more computing devices to further implement:
   evaluating another computing resource from one or more sources for the different computing resources to identify the another computing resource for performance of the next one of the different portions of the distributed data processing program; and
   assigning the another computing resource for performing the next one of the different portions of the distributed data processing program.

20. The non-transitory, computer-readable storage medium of claim 14, wherein the one or more computing devices are implemented as part of a map reduce service offered by a provider network and wherein the request to cause the performance of the distributed data processing program is a request to perform a job at the map reduce service.

* * * * *